(12) United States Patent
Xin et al.

(10) Patent No.: US 11,855,824 B2
(45) Date of Patent: Dec. 26, 2023

(54) DATA MODULATION METHOD AND APPARATUS, DEVICE, AND STORAGE MEDIUM

(71) Applicant: ZTE CORPORATION, Shenzhen (CN)

(72) Inventors: Yu Xin, Shenzhen (CN); Tong Bao, Shenzhen (CN); Jin Xu, Shenzhen (CN); Guanghui Yu, Shenzhen (CN); Liujun Hu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/008,543

(22) PCT Filed: May 27, 2021

(86) PCT No.: PCT/CN2021/096222
§ 371 (c)(1),
(2) Date: Dec. 6, 2022

(87) PCT Pub. No.: WO2021/258975
PCT Pub. Date: Dec. 30, 2021

(65) Prior Publication Data
US 2023/0216720 A1  Jul. 6, 2023

(30) Foreign Application Priority Data

Jun. 22, 2020  (CN) .......................... 202010576030.2

(51) Int. Cl.
*H04B 7/06* (2006.01)
*H04B 7/08* (2006.01)
*H04L 27/26* (2006.01)
*H04L 27/34* (2006.01)

(52) U.S. Cl.
CPC ...... *H04L 27/2617* (2013.01); *H04L 27/3411* (2013.01)

(58) Field of Classification Search
CPC .......................... H04L 27/2617; H04L 27/3411
USPC .......................................................... 375/262
See application file for complete search history.

(56) References Cited

U.S. PATENT DOCUMENTS

2019/0149381 A1  5/2019  Vos

FOREIGN PATENT DOCUMENTS

| CN | 101361305 A | | 2/2009 | |
| CN | 101867555 A | | 10/2010 | |
| CN | 108476115 A | * | 8/2018 | ......... H04L 27/2078 |
| CN | 108476115 A | | 8/2018 | |
| CN | 111901275 A | | 11/2020 | |
| KR | 20180080073 A | * | 7/2018 | ........... H04L 1/0054 |

OTHER PUBLICATIONS

International Search Report in Application No. PCT/CN2021/096222 dated Sep. 1, 2021, 4 pages including translation.

* cited by examiner

*Primary Examiner* — Tanmay K Shah
(74) *Attorney, Agent, or Firm* — Morgan, Lewis & Bockius LLP

(57) ABSTRACT

Provided are a data modulation method and apparatus, a device, and a storage medium. The data modulation method comprises: modulating data according to a configured constellation point modulation symbol S(n) set, wherein n is an integer between 0 and N−1, and N is an even integer greater than or equal to 4; and transmitting the modulated data on a physical resource.

20 Claims, 7 Drawing Sheets

DATA MODULATION METHOD AND APPARATUS, DEVICE, AND STORAGE MEDIUM

CROSS REFERENCE TO RELATED APPLICATIONS

This is a National Stage Application filed under 35 U.S.C. 371, based on International Patent Application No. PCT/CN2021/096222 filed on May 27, 2021, which is based on claims priority to Chinese Patent Application No. 202010576030.2 filed with the China National Intellectual Property Administration (CNIPA) on Jun. 22, 2020, the disclosures of which are incorporated herein by reference in their entireties.

TECHNICAL FIELD

The present application relates to the field of data processing, for example, a data modulation method and apparatus, a device, and a storage medium.

BACKGROUND

In a high-frequency communication scenario, since the path loss and shadow fading of signals are relatively large, some areas at the edge of a cell have a very low signal-to-noise ratio. In the high-frequency scenario, the work efficiency of a power amplifier is also relatively low. In order to increase the signal-to-noise ratio and reduce the power consumption of user equipment, the peak-to-average power ratio of the transmit signal of the user equipment is required to be low. In 5th-generation (5G) new radio (NR) standards, there is yet no clear scheme to the modulation mode with the modulation order greater than 1.

SUMMARY

The present application provides a data modulation method and apparatus, a device, and a storage medium to effectively reduce the peak-to-average power ratio of transmit data in a high-order modulation scenario.

An embodiment of the present application provides a data modulation method. The method includes the following.

Data is modulated according to a configured constellation point modulation symbol $S(n)$ set, where n is an integer between 0 and N−1, and N is an even integer greater than or equal to 4; and the modulated data is transmitted on a physical resource.

An embodiment of the present application further provides a data modulation apparatus. The apparatus includes a modulation module and a transmission module.

The modulation module is configured to modulate data according to a configured constellation point modulation symbol $S(n)$ set, where n is an integer between 0 and N−1, and N is an even integer greater than or equal to 4. The transmission module is configured to transmit modulated data on a physical resource.

An embodiment of the present application further provides a device. The device includes a memory, a processor, a program stored in the memory and executable by the processor, and a data bus configured to enable a connection communication between the processor and the memory, when executed by the processor, the program performs the preceding data modulation method.

An embodiment of the present application further provides a readable and writeable storage medium configured to be stored in a computer, where the storage medium stores one or more programs, and the one or more programs are executable by one or more processors to perform the preceding data modulation method.

The embodiments of the present application provide a data modulation method and apparatus, a device, and a storage medium. The data modulation method includes that data is modulated according to a configured constellation point modulation symbol $S(n)$ set, where n is an integer between 0 and N−1, and N is an even integer greater than or equal to 4; and the modulated data is transmitted on a physical resource. In this manner, with the configuration of a constellation point modulation symbol set, modulation is performed on the data according to the configured modulation symbol set, and the peak-to-average power ratio of the transmit data can be effectively reduced in the high-order modulation scenario.

DETAILED DESCRIPTION

The embodiments of the present application are described below in conjunction with drawings.

In addition, in the embodiments of the present application, the word "optionally" or "exemplarily" is used for representing examples, illustrations, or descriptions. Any embodiment or design described herein as "optional" or "exemplary" is not necessarily to be construed as preferred or advantageous over other embodiments or designs. Rather, the use of the word "optionally" or "exemplarily" is intended to present related concepts in a concrete fashion.

Figure 1:
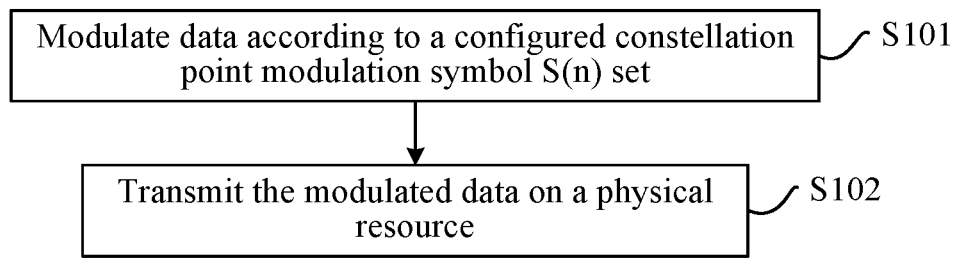
FIG. 1 is a flowchart of a data modulation method according to an embodiment of the present application.

FIG. 1 is a flowchart of a data modulation method according to an embodiment of the present application. As shown in FIG. 1, the method includes S101 and S102.

In S101, data is modulated according to a configured constellation point modulation symbol $S(n)$ set.

For example, the preceding configured constellation point modulation symbol $S(n)$ set may be in the form of $\{S(0), S(1), \ldots, S(N-1)\}$, that is, n is an integer having a range of 0 to N−1, and N is an even integer greater than or equal to 4.

The modulated data may be data sent by user equipment, that is, S101 may be understood as the operation where the data sent by the user equipment is modulated based on the configured $S(n)$ set.

In S102, the modulated data is transmitted on a physical resource.

After the sent data is modulated according to S101, the modulated data is transmitted on the physical resource.

In an embodiment, the modulated data may be directly transmitted in the time domain. For example, the modulated data may be transmitted on a radio frequency link after processing such as filtering and digital-to-analog conversion is performed on the modulated data, or the modulated data is transmitted on the radio frequency link after discrete Fourier transform (DFT), resource mapping, inverse discrete Fourier transform (IDFT) and digital-to-analog conversion.

In the data modulation method provided by the embodiments of the present application, data is modulated according to a configured constellation point modulation symbol $S(n)$ set, where n is an integer between 0 and N−1, and N is an even integer greater than or equal to 4; and the modulated data is transmitted on a physical resource. In this manner, with the configuration of a constellation point modulation symbol set, the modulation is performed on the data according to the configured modulation symbol set, and the peak-to-average power ratio of the transmit data can be effectively reduced in the high-order modulation scenario.

In an embodiment, the $S(n)$ set configured in S101 may be divided into two subgroups. Each subgroup includes N/2 $S(n)$, the phase difference between any two $S(n)$ in each subgroup is less than or equal to $\pi/2$, and $S(n)$ phase averages of the two subgroups differ by $\pi$.

Figure 2:
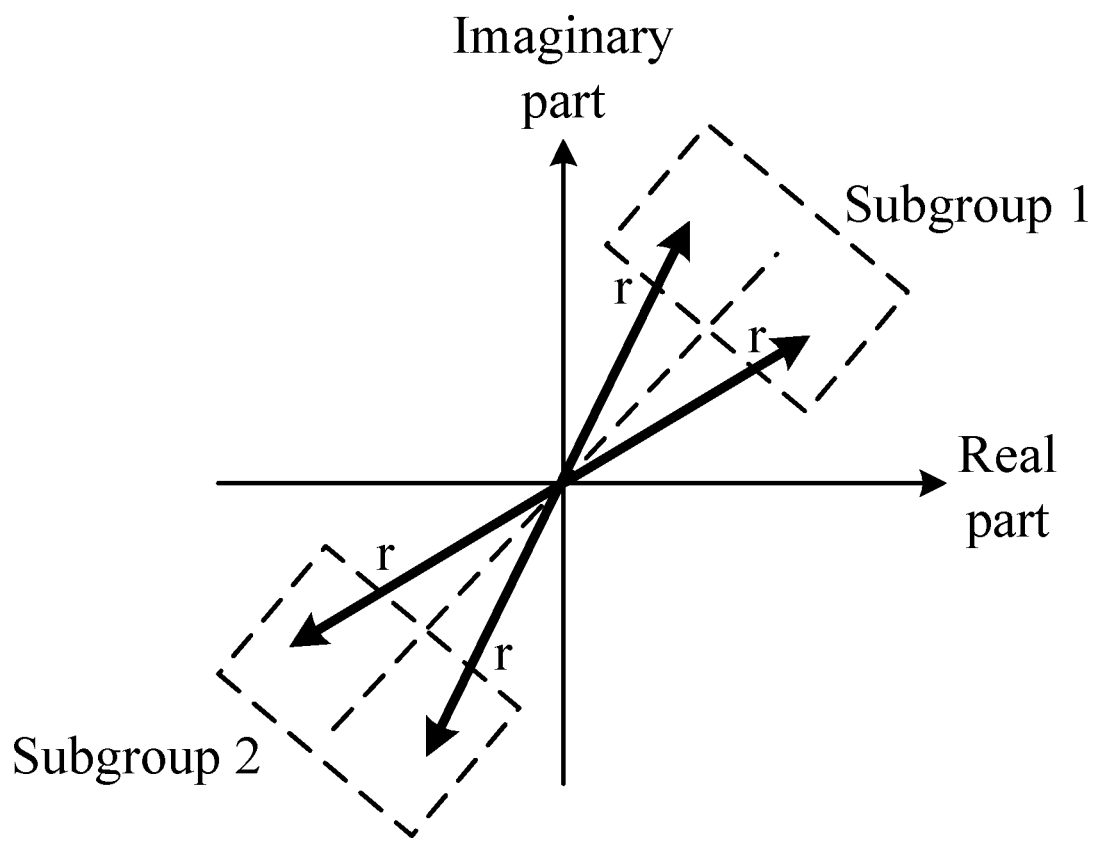
FIG. 2 is a structure diagram of an $S(n)$ set according to an embodiment of the present application.

For example, assuming that the value of N is 4, namely, the configured $S(n)$ set has four constellation point modulation symbols that are $S(0)$, $S(1)$, $S(2)$, and $S(3)$, respectively. The four modulation symbols $S(0)$, $S(1)$, $S(2)$, and $S(3)$ are divided into two subgroups, that is, subgroup 1 and subgroup 2, respectively. As shown in FIG. 2, assuming that phases of the two modulation symbols $S(n)$ in subgroup 1 are $\pi/8$ and $3\pi/8$, respectively, the phase difference between the two $S(n)$ is $\pi/4$, and the phase average is $2\pi/8$; and assuming that the phases of the two modulation symbols $S(n)$ in subgroup 2 are $9\pi/8$ and $11\pi/8$, respectively, the phase difference between the two $S(n)$ in subgroup 2 is $\pi/4$, and the phase average is $10\pi/8$.

In an embodiment, the constellation point modulation symbol $S(n)$ set shown in FIG. 2 may also be an $e^{j\varphi}S(n)$ set, where $\varphi$ may be any value.

Figure 3:
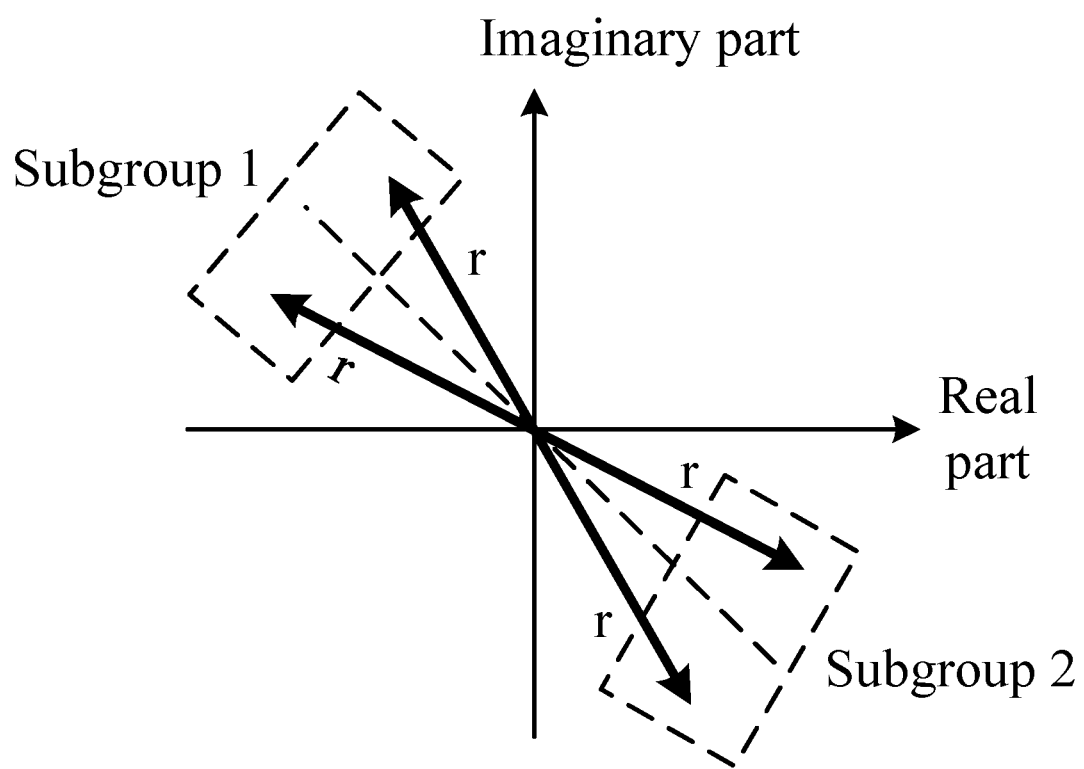
FIG. 3 is a schematic diagram of an $S(n)$ set according to an embodiment of the present application.

As shown in FIG. 3, assuming that the phases of the two modulation symbols $S(n)$ in subgroup 1 are $5\pi/8$ and $7\pi/8$, respectively, the phase difference between the two $S(n)$ is $\pi/4$, and the phase average is $6\pi/8$; and assuming that the phases of the two modulation symbols $S(n)$ in subgroup 2 are $13\pi/8$ and $15\pi/8$, respectively, the phase difference between the two $S(n)$ in subgroup 2 is $\pi/4$, and the phase average is $14\pi/8$.

Figure 4:
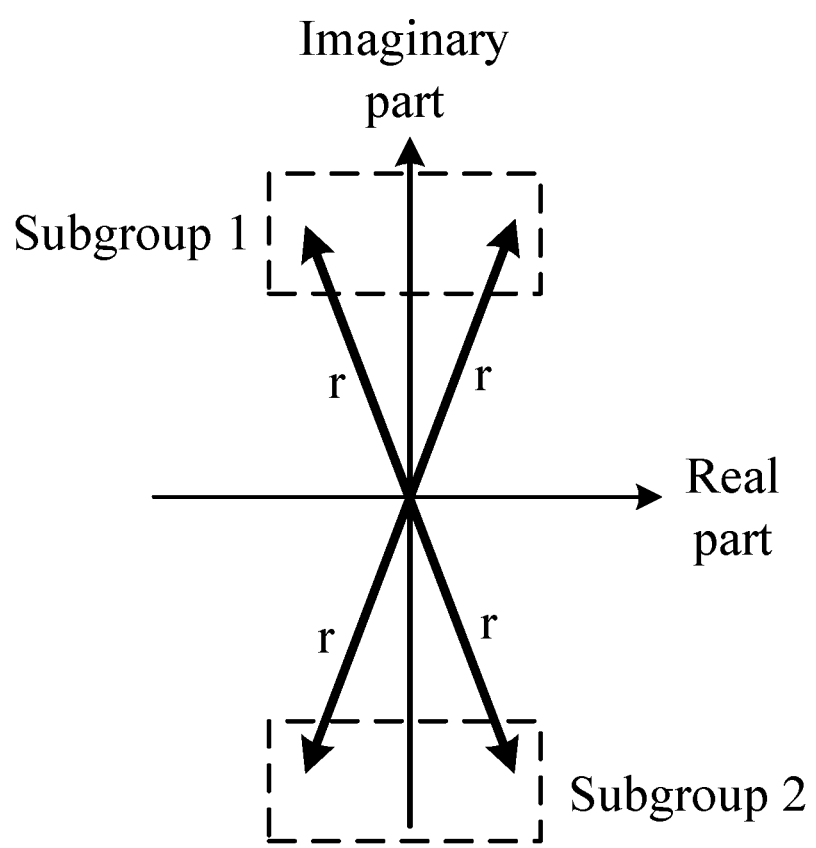
FIG. 4 is a schematic diagram of an $S(n)$ set according to an embodiment of the present application.

As shown in FIG. 4, assuming that the phases of the two modulation symbols $S(n)$ in subgroup 1 are $\varphi$ and $\varphi+\pi/4$, respectively, the phase difference between the two $S(n)$ is $\pi/4$, and the phase average is $\varphi+\pi/8$; and assuming that the phases of the two modulation symbols $S(n)$ in subgroup 2 are $\pi+\varphi$ and $\pi+\varphi+\pi/4$, respectively, the phase difference between the two $S(n)$ is $\pi/4$, and the phase average is $\pi+\varphi+\pi/8$; where $\varphi$ may be any value.

In the examples in the above three figures (FIGS. 2 to 4), each subgroup includes N/2 $S(n)$, that is, two $S(n)$, the phase difference between the two $S(n)$ in each subgroup is less than or equal to $\pi/2$, and $S(n)$ phase averages of the two subgroups differ by $\pi$.

Exemplarily, the $S(n)$ phase averages of the two subgroups differing by $\pi$ may include $S(n)$ and $-S(n)$ belonging to the same $S(n)$ set, that is, two symbols whose phase difference is $\pi$ may belong to the same constellation point modulation symbol set, or, it can be understood that the $S(n)$ set and $-S(n)$ set are the same constellation point modulation symbol set.

In an embodiment, in each subgroup, the average phase difference of all $S(n)$ except $S(n)$ with a phase difference of 0 may be configured to be less than $\pi/2$.

In an embodiment, the $S(n)$ phase averages of the two subgroups may be configured to differ by $\pi$.

In an embodiment, the minimum modulus of $S(n)$ in each subgroup may be configured to be greater than half of the minimum modulus difference of $S(n)$ in each subgroup, or the minimum modulus of $S(n)$ in each subgroup may be configured to be greater than the minimum modulus difference of $S(n)$ in each subgroup, so as to minimize the modulus difference between $S(n)$ as much as possible, thereby reducing the peak-to-average power ratio of the data symbols.

For example, assuming that the value of N is 8, namely, the $S(n)$ set is configured to have eight constellation point modulation symbols that are $\{S(0), S(1), \ldots, S(7)\}$. The eight $S(n)$ are divided into two subgroups that are subgroup 1 and subgroup 2, respectively, and each subgroup includes four $S(n)$. The phase difference of any two $S(n)$ among the four $S(n)$ in subgroup 1 is less than or equal to $\pi/2$, the phase difference of any two $S(n)$ among the four $S(n)$ in subgroup 2 is less than or equal to $\pi/2$, and the $S(n)$ phase averages of subgroup 1 and subgroup 2 differ by $\pi$.

Figure 5:
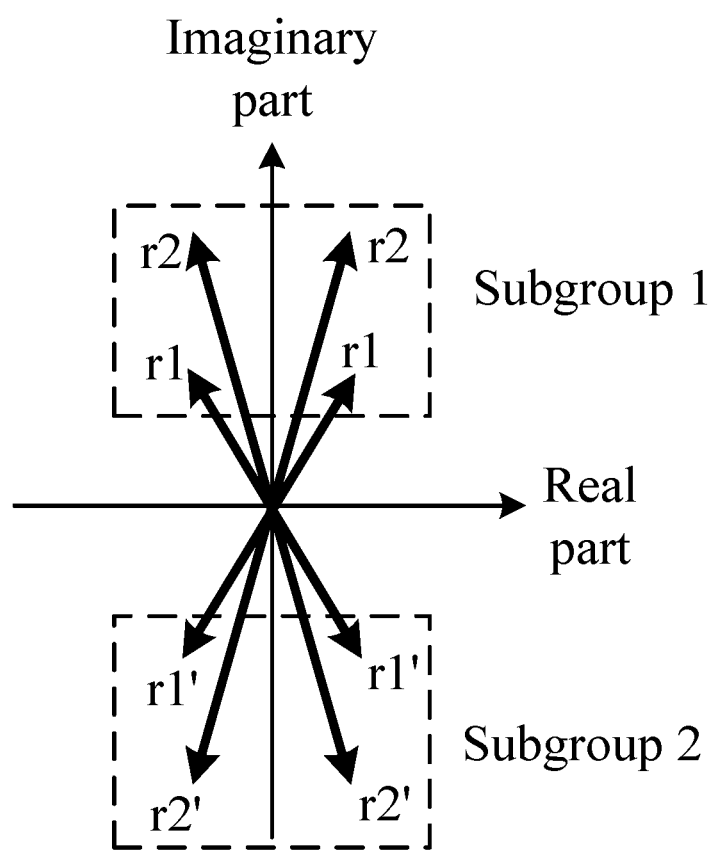
FIG. 5 is a schematic diagram of an $S(n)$ set according to an embodiment of the present application.

As shown in FIG. 5, assuming that the moduli of the four $S(n)$ in subgroup 1 are r1, r2, r2, and r1, respectively and the moduli of the four modulation symbols in subgroup 2 are r1', r2', r2', and r1', respectively, the modulus of each $S(n)$ in subgroup 1 is equal to the modulus of a respective $S(n)$ in the other subgroup. In subgroup 1, the minimum modulus of $S(n)$ is |r1|, the minimum modulus difference is |r2−r1|, the minimum modulus of $S(n)$ in subgroup 1 is greater than the minimum modulus difference in subgroup 1, that is, |r1|>|r2−r1|, and the minimum modulus of $S(n)$ in subgroup 1 is also greater than half of the minimum modulus difference in subgroup 1. In subgroup 2, the minimum modulus of $S(n)$ is |r1'|, the minimum modulus difference is |r2'−r1'|, the minimum modulus of $S(n)$ in subgroup 2 is greater than the minimum modulus difference in subgroup 2, that is, |r1'|>|r2'−r1'|, and the minimum modulus of $S(n)$ in subgroup 2 is also greater than half of the minimum modulus difference within subgroup 2.

In an embodiment, the operation where the data is modulated according to the $S(n)$ set in S101 may be that the data is modulated by alternately using the $S(n)$ set and an $e^{j\theta}S(n)$ set, where the $e^{j\theta}S(n)$ set and the $S(n)$ set are different constellation point modulation symbol sets, and the value of $\theta$ is $\pm\pi/2$.

Since the phase difference of any two $S(n)$ in each subgroup of the configured $S(n)$ set is less than or equal to $\pi/2$ and the $S(n)$ phase averages of the two subgroups differ by $\pi$, when the data is modulated by alternately using the $S(n)$ set and the $e^{j\theta}S(n)$ set, the phase difference of adjacent $S(n)$ may be less than $\pi$, and when $\theta=\pm\pi/2$, the maximum phase difference of adjacent $S(n)$ may be minimized. In this manner, the peak-to-average power ratio of the modulated data symbols is relatively small.

Exemplarily, the data may be modulated by alternately using the $S(n)$ set and the $e^{j\theta}S(n)$ set in the following manner: the data is modulated in units of every $\log_2 N$ binary bit data by alternately using the $S(n)$ set and the $e^{j\theta}S(n)$ set. The binary bit data is an encoded data sequence.

Figure 6:
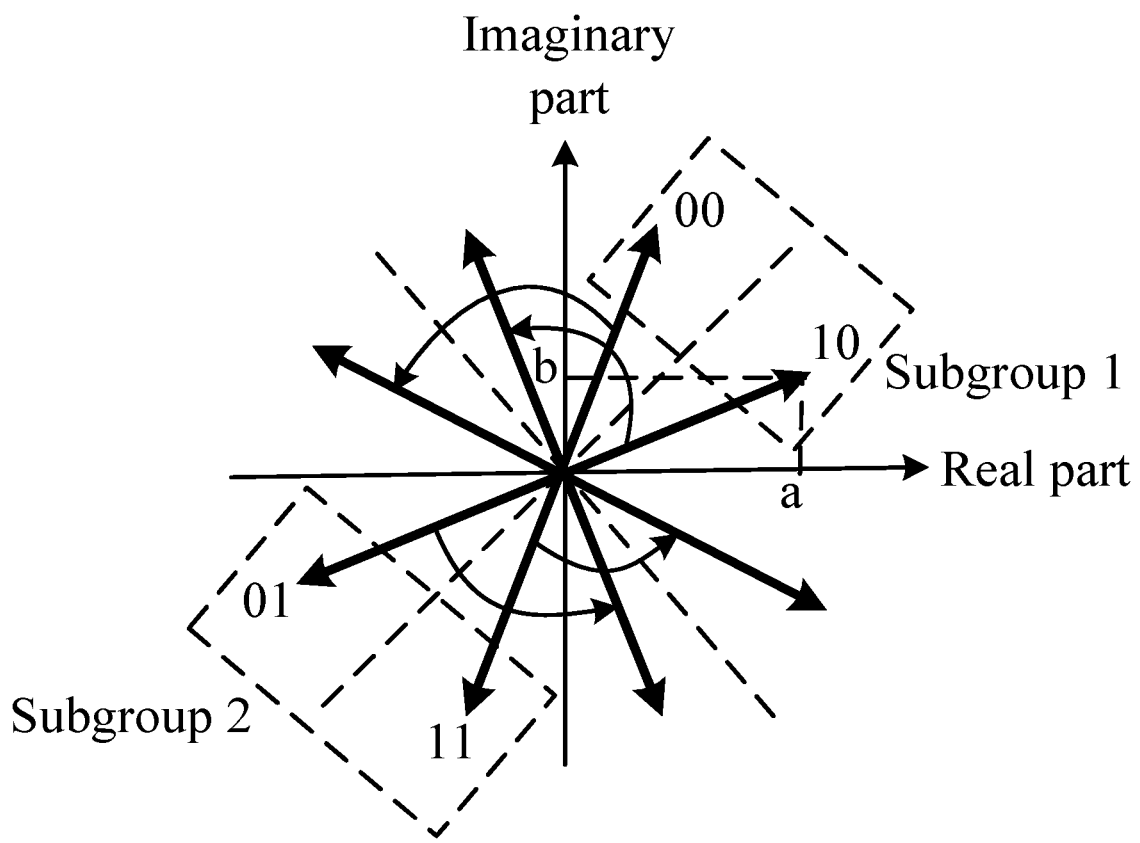
FIG. 6 is a schematic diagram of modulation of data according to an $S(n)$ set according to an embodiment of the present application.

As shown in FIG. 6, assuming that the binary bit data D is [0000010110101111], the data is modulated according to the constellation point modulation symbols shown in FIG. 2. That is, the binary bit data D is $[d_0d_1d_2d_3d_4d_5d_6d_7]$ obtained after the modulation in units of every two (that is, $\log_2 4$) binary bit data. Based on the sequence $[d_0d_1d_2d_3d_4d_5d_6d_7]$, the data is modulated in a manner where the S(n) set and the $e^{j\theta}S(n)$ set are alternately used to obtain a data symbol sequence DS, and DS=$[s_0s_1s_2s_3s_4s_5s_6s_7]$=[b+aj, —a+bj, —a-bj, b-aj, a+bj, —b+aj, —b-aj, a-bj].

The preceding implementation is described hereinafter in conjunction with the following specific example.

It is assumed that $d_0$=[00], $d_1$=[00], $d_2$=[01], $d_3$=[01], $d_4$=[10], $d_5$=[10], $d_6$=[11], $d_7$=[11], and $\theta=\pi/2$. $d_0$ is modulated by using S(n) to obtain the data symbol $s_0$, $d_1$ is modulated by using jS(n) to obtain the data symbol $s_1$, $d_2$ is modulated by using S(n) to obtain the data symbol $s_2$, $d_3$ is modulated by using j S(n) to obtain the data symbol $s_3$, $d_4$ is modulated by using S(n) to obtain the data symbol $s_4$, $d_5$ is modulated by using j S(n) to obtain the data symbol $s_5$, $d_6$ is modulated by using S(n) to obtain the data symbol $s_6$, and $d_7$ is modulated by using j S(n) to obtain the data symbol $s_7$, where $s_0$=[b+aj], $s_1$=[-a+bj], $s_2$=[-a-bj], $s_3$=[b-aj], $s_4$=[a+bj], $s_5$=[-b+aj], $s_6$=[-b-aj], and $s_7$=[a-bj].

Exemplarily, the data may also be modulated by using the S(n) set and the $e^{j\theta}S(n)$ set alternately in the following manner: the data is modulated by using an $e^{j\theta k}S(n)$ set in units of every $\log_2 N$ binary bit data, where the binary bit data is an encoded data sequence, k is the location number of a data symbol obtained after modulation, k is an integer having the range of 0 to K-1, K is the number of data symbols obtained after the modulation, and $\theta=\pm\pi/2$. When k is an even number, $e^{j\theta k}=\pm 1$, and the S(n) set and the –S(n) set are the same constellation point modulation symbol set. That is, the $e^{j\theta k}S(n)$ set and the $e^{j\theta(k+2)}$ set are the same constellation point modulation symbol set.

Figure 7:
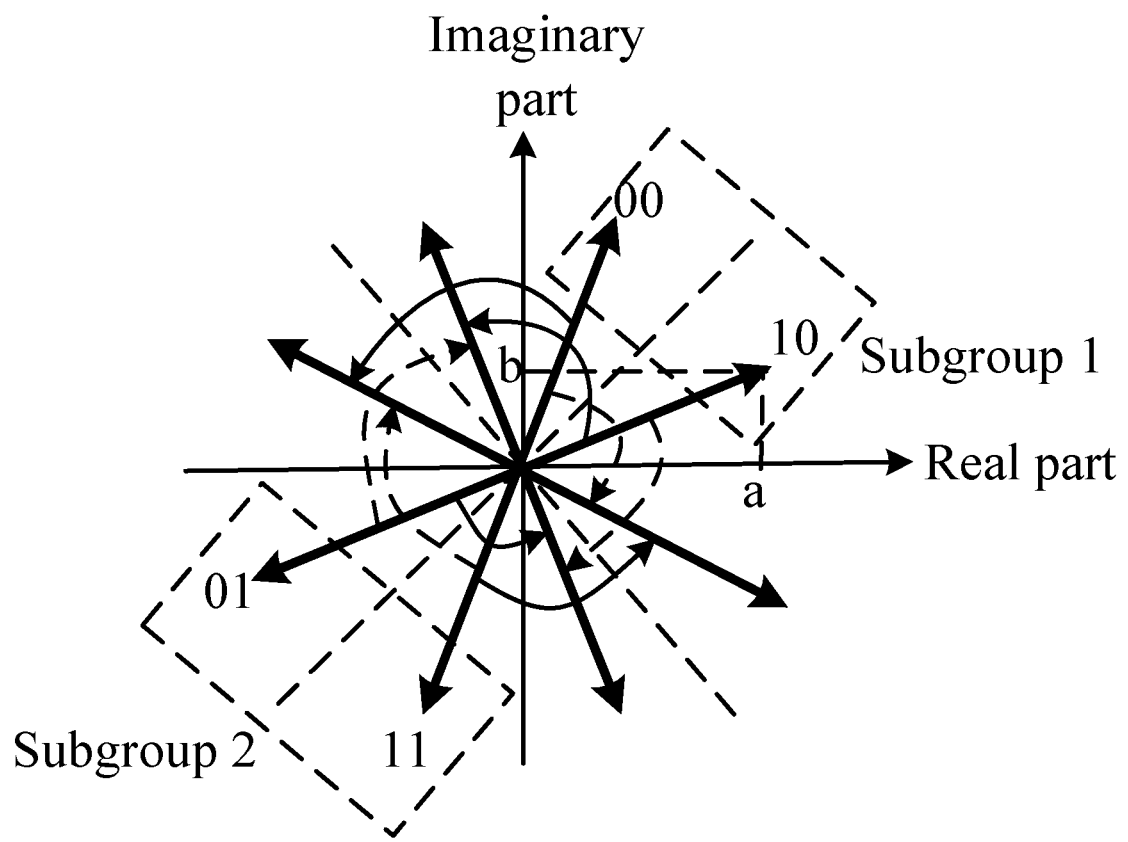
FIG. 7 is a schematic diagram of modulation of data according to an $S(n)$ set according to an embodiment of the present application.

Similarly, assuming that the binary bit data D is [0000010110101111], as shown in FIG. 7, the data is modulated according to the constellation point modulation symbols shown in FIG. 2. That is, the binary bit data D is $[d_0d_1d_2d_3d_4d_5d_6d_7]$ obtained after the modulation in units of every two (that is, $\log_2 4$) binary bit data. Based on the sequence $[d_0d_1d_2d_3d_4d_5d_6d_7]$, the data is modulated by using the $e_{j\theta k}S(n)$ set to obtain a data symbol sequence DS, and DS=$[s_0s_1s_2s_3s_4s_5s_6s_7]$=[b+aj, -a+bj, a+bj, -b+aj, a+bj, —b+aj, b+aj, —a+bj].

The preceding implementation is described hereinafter in conjunction with the following specific example.

It is assumed that $d_0$=[00], $d_1$=[00], $d_2$=[01], $d_3$=[01], $d_4$=[10], $d_5$=[10], $d_6$=[11], $d_7$=[11], and $\theta=\pi/2$. $d_0$ is modulated by using $e^{j\theta k}S(n)$ (k=0) to obtain the data symbol $s_0$, $d_1$ is modulated by using $e^{j\theta k}S(n)$ (k=1) to obtain the data symbol $s_1$, $d_2$ is modulated by using $e^{j\theta k}S(n)$ (k=2) to obtain the data symbol $s_2$, $d_3$ is modulated by using $e^{j\theta k}S(n)$ (k=3) to obtain the data symbol $s_3$, $d_4$ is modulated by using $e^{j\theta k}S(n)$ (k=4) to obtain the data symbol $s_4$, $d_5$ is modulated by using $e^{j\theta k}S(n)$ (k=5) to obtain the data symbol $s_5$, $d_6$ is modulated by using (n) (k=6) to obtain the data symbol $s_6$, and $d_7$ is modulated by using $e^{j\theta k}S(n)$ (k=7) to obtain the data symbol $s_7$, where $s_0$=[b+aj], $s_1$=[j(b+aj)]=[-a+bj], $s_2$=[-(-a-bj)]=[a+bj], $s_3$=[—j (—a-bj)]=[-b+aj], $s_4$=[a+bj], $s_5$=[j(a+bj)]=[-b+aj], $s_6$=[-(-b-aj)]=[b+aj], and $s_7$=[-j(-b-aj)]=[-a+bj].

In the process where the data is modulated in units of every $\log_2 N$ binary bit data, one-bit data for distinguishing different subgroups exists in every $\log_2 N$ binary bit data. For example, as shown in FIG. 6, the second-bit data of 0 indicates subgroup 1, and the second-bit data of 1 indicates subgroup 2, that is, there is one-bit data for modulation of different subgroups.

Since the number N of S(n) in the configured S(n) set is an even integer greater than or equal to 4, the larger the value of N is, the larger the value of $\log_2 N$ is. In this manner, a high-order modulation scheme can be adopted to improve the data transmission rate.

In an embodiment, in a case where the data to be modulated includes two encoded data blocks, the operation where the data is modulated according to the S(n) set in S101 may be performed in the following manner: any one of the two encoded data blocks is modulated according to different subgroups in the S(n) set, and the other encoded data block is modulated according to S(n) in a subgroup of the S(n) set, where the other encoded data block is an encoded data block other than the one encoded data block in the two encoded data blocks.

Figure 8:
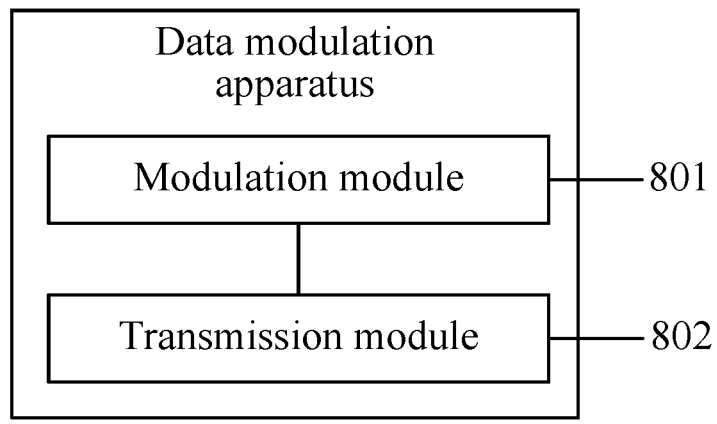
FIG. 8 is a structure diagram of a data modulation apparatus according to an embodiment of the present application.

FIG. 8 is a structure diagram of a data modulation apparatus according to an embodiment of the present application. As shown in FIG. 8, the apparatus includes a modulation module 801 and a transmission module 802. The modulation module 801 is configured to modulate data according to a configured constellation point modulation symbol S(n) set, where n is an integer between 0 and N–1, and N is an even integer greater than or equal to 4. The transmission module 802 is configured to transmit the modulated data on a physical resource.

In an embodiment, the configured S(n) set may be divided into two subgroups. Each subgroup includes N/2 S(n), the phase difference between any two S(n) in each subgroup is less than or equal to $\pi/2$, and S(n) phase averages of the two subgroups differ by $\pi$. The case where the S(n) phase averages of the two subgroups differ by $\pi$ may include the following case: S(n) and –S(n) belong to the same S(n) set.

In each subgroup, the average phase difference of all S(n) in the configured S(n) set except S(n) with a phase difference of 0 is less than $\pi/2$.

In an embodiment, the S(n) phase averages of the two subgroups may be configured to differ by $\pi$.

In an embodiment, the minimum modulus of S(n) in each subgroup may be configured to be greater than half of the minimum modulus difference of S(n) in each subgroup, or the minimum modulus of S(n) in each subgroup may be configured to be greater than the minimum modulus difference of S(n) in each subgroup, so as to minimize the modulus difference between S(n) as much as possible, thereby reducing the peak-to-average power ratio of the data symbols.

In an embodiment, the modulation module 801 may be configured to modulate the data by alternately using the S(n) set and an $e^{j\theta}S(n)$ set, where the $e^{j\theta}S(n)$ set and the S(n) set are different constellation point modulation symbol sets, and the value of $\theta$ is $\pm\pi/2$.

In an embodiment, the modulation module 801 is configured to modulate the data in units of every $\log_2 N$ binary bit data in a manner where the S(n) set and the $e^{j\theta}S(n)$ set are alternately used.

In an embodiment, the modulation module 801 is configured to modulate the data in units of every $\log_2 N$ binary bit data using an $e^{j\theta k}S(n)$ set, where k is the location number of a data symbol obtained after modulation, k is an integer between 0 and K–1, and K is the number of data symbols obtained after modulation. One-bit data for distinguishing different subgroups exists in every $\log_2 N$ binary bit data.

In an embodiment, in a case where the data to be modulated includes two encoded data blocks, the modulation module 801 may be configured to modulate one of the two encoded data blocks according to different subgroups in the S(n) set, and modulate the other encoded data block according to S(n) in a subgroup of the S(n) set, where the other encoded data block is an encoded data block other than the one encoded data block in the two encoded data blocks.

The data modulation apparatus provided by this embodiment is configured to perform the data modulation method in the embodiment shown in FIG. 1. The implementation principles and technical effects of the apparatus are similar to those of the method, and details will not be repeated herein.

Figure 9:
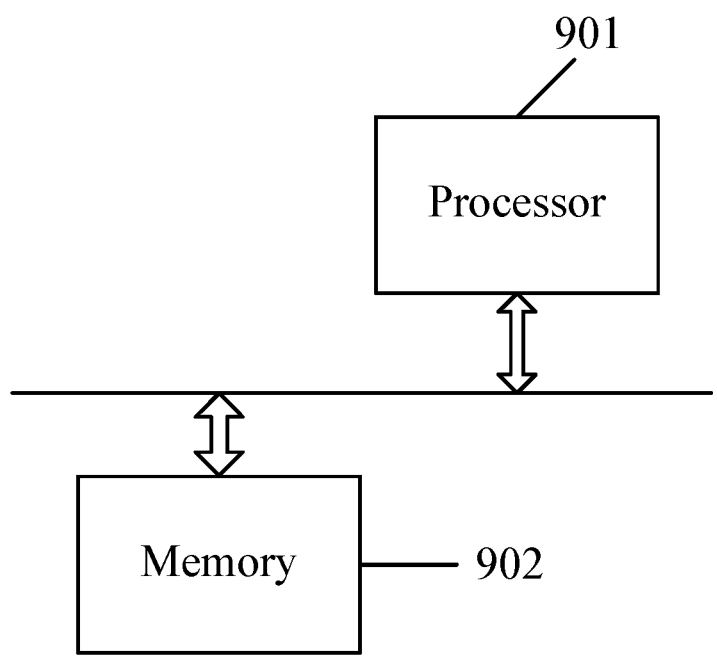
FIG. 9 is a structure diagram of a device according to an embodiment of the present application.

FIG. 9 is a structure diagram of a device according to an embodiment of the present application. As shown in FIG. 9, the device includes a processor 901 and a memory 902. The number of processors 901 in the device may be one or more, and one processor 901 is illustrated as an example in FIG. 9. The processor 901 and the memory 902 in the device may be connected via a bus or in other manners, and the connection via the bus is illustrated as an example in FIG. 9.

As a computer-readable storage medium, the memory 902 may be configured to store software programs, computer-executable programs and modules, such as program instructions/modules corresponding to the data modulation method in the embodiments of the present application (for example, the modulation module 801 and the transmission module 802 in the data modulation apparatus). The processor 901 runs the software programs, instructions or modules stored in the memory 902 to perform the preceding data modulation method.

The memory 902 may mainly include a program storage region and a data storage region, where the program storage region may store an operating system and an application program required by at least one function while the data storage region may store data created depending on the use of a set-top box. In addition, the memory 902 may include a high-speed random-access memory and may also include a non-volatile memory such as at least one disk memory, flash memory or another non-volatile solid-state memory.

An embodiment of the present application further provides a readable and writeable storage medium configured to be stored in a computer, where the storage medium stores one or more programs, and the one or more programs are executable by one or more processors to perform the data modulation method. The method includes the following.

Data is modulated according to a configured constellation point modulation symbol S(n) set, where n is an integer between 0 and N−1, and N is an even integer greater than or equal to 4; and the modulated data is transmitted on a physical resource.

All or part of the steps of the method and function modules/units in the system and the apparatus disclosed above may be implemented as software, firmware, hardware, and suitable combinations thereof.

In the hardware implementation, the division of the preceding function modules/units may not correspond to the division of physical components. For example, one physical component may have multiple functions, or one function or step may be performed jointly by multiple physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). The term computer storage media include volatile and non-volatile as well as removable and non-removable media implemented in any method or technology for storing information (such as computer-readable instructions, data structures, program modules or other data). The computer storage media include, but are not limited to, a random access memory (RAM), a read-only memory (ROM), an electrically erasable programmable read-only memory (EEPROM), a flash memory or other memory technologies, a compact disc read-only memory (CD-ROM), a digital versatile disc (DVD) or other optical storages, a magnetic cassette, a magnetic tape, a magnetic disk or other magnetic storage devices, or any other medium for storing desired information that can be accessed by a computer.

Additionally, the communication media generally include computer-readable instructions, data structures, program modules, or other data in modulated data signals such as carriers or other transport mechanisms and may include any information delivery medium.

ource.

What is claimed is:

1. A data modulation method, comprising:
 modulating data according to a configured constellation point modulation symbol set,
 wherein a constellation point modulation symbol in the configured constellation point modulation symbol set is denoted by S(n), n is an integer between 0 and N−1, and N is an even integer greater than or equal to 4; and
 transmitting the modulated data on a physical resource;
 wherein modulating the data according to the configured S(n) set comprises:
 modulating the data by alternately using the S(n) set and an $e^{j\theta}S(n)$ set;
 wherein the $e^{j\theta}S(n)$ set and the S(n) set are different constellation point modulation symbol sets.

2. The method of claim 1, wherein the configured S(n) set is divided into two subgroups, each of the two subgroups comprises N/2 S(n), a phase difference between every two (n) in each of the two subgroups is less than or equal to $\pi/2$, and S(n) phase averages of the two subgroups differ by $\pi$.

3. The method of claim 2, wherein in each of the two subgroups, an average phase difference of all S(n) except S(n) with a phase difference of 0 is less than $\pi/2$.

4. The method of claim 2, wherein the S(n) phase averages of the two subgroups differing by $\pi$ comprises:
 S(n) and −S(n) belong to a same S(n) set.

5. The method of claim 2, wherein in each of the two subgroups, a minimum modulus of S(n) in each of the two subgroups is greater than half of a minimum modulus difference of S(n) in each of the two subgroups, or a minimum modulus of S(n) in each of the two subgroups is greater than a minimum modulus difference of S(n) in each of the two subgroups.

6. The method of claim 1, wherein a value of $\theta$ is $\pm\pi/2$.

7. The method of claim 6, wherein modulating the data by alternately using the S(n) set and the $e^{j\theta}S(n)$ set comprises:
 modulating the data in units of every $\log_2 N$ binary bit data in a manner where the S(n) set and the $e^{j\theta}S(n)$ set are alternately used.

8. The method of claim 6, wherein modulating the data by alternately using the S(n) set and the $e^{j\theta}S(n)$ set comprises:
 modulating the data in units of every $\log_2 N$ binary bit data by using an $e^{j\theta k}S(n)$ set;

wherein k is a location number of a data symbol obtained after modulation, k is an integer between 0 and K−1, and K is a number of data symbols obtained after the modulation.

9. The method of claim 7, wherein one-bit data for distinguishing different subgroups exists in every $\log_2 N$ binary bit data.

10. The method of claim 1, wherein in a case where the data comprises two encoded data blocks, modulating the data according to the configured S(n) set comprises:
modulating one of the two encoded data blocks according to different subgroups in the S(n) set; and
modulating another encoded data block according to S(n) in a subgroup of the S(n) set;
wherein the another encoded data block is an encoded data block other than the one of the two encoded data blocks.

11. A data modulation apparatus, comprising:
a modulation module, which is configured to modulate data according to a configured constellation point modulation symbol set,
wherein a constellation point modulation symbol in the configured constellation point modulation symbol set is denoted by S(n), n is an integer between 0 and N−1, and N is an even integer greater than or equal to 4; and
a transmission module, which is configured to transmit the modulated data on a physical resource;
wherein the modulation module is configured to modulate the data by alternately using the S(n) set and an $e^{j\theta}S(n)$ set;
wherein the $e^{j\theta}S(n)$ set and the S(n) set are different constellation point modulation symbol sets.

12. A device, comprising a memory, a processor, a program stored in the memory and executable by the processor, and a data bus configured to enable a connection communication between the processor and the memory, wherein the program, when executed by the processor, performs the following:
modulating data according to a configured constellation point modulation symbol set,
wherein a constellation point modulation symbol in the configured constellation point modulation symbol set is denoted by S(n), n is an integer between 0 and N−1, and N is an even integer greater than or equal to 4; and
transmitting the modulated data on a physical resource;

wherein the program performs modulating the data according to the configured S(n) set by:
modulating the data by alternately using the S(n) set and an $e^{j\theta}S(n)$ set;
wherein the $e^{j\theta}S(n)$ set and the S(n) set are different constellation point modulation symbol sets.

13. A non-transitory readable and writeable storage medium, configured to be stored in a computer, wherein the storage medium stores at least one program, and the at least one program is executable by at least one processor to perform the data modulation method of claim 1.

14. The device of claim 12, wherein the configured S(n) set is divided into two subgroups, each of the two subgroups comprises N/2 S(n), a phase difference between every two S(n) in each of the two subgroups is less than or equal to π/2, and S(n) phase averages of the two subgroups differ by π.

15. The device of claim 14, wherein in each of the two subgroups, an average phase difference of all S(n) except S(n) with a phase difference of 0 is less than π/2.

16. The device of claim 14, wherein the S(n) phase averages of the two subgroups differing by it comprises:
S(n) and −S(n) belong to a same S(n) set.

17. The device of claim 14, wherein in each of the two subgroups, a minimum modulus of S(n) in each of the two subgroups is greater than half of a minimum modulus difference of S(n) in each of the two subgroups, or a minimum modulus of S(n) in each of the two subgroups is greater than a minimum modulus difference of S(n) in each of the two subgroups.

18. The device of claim 12, wherein a value of θ is ±π/2.

19. The device of claim 18, wherein the program performs modulating the data by alternately using the S(n) set and the $e^{j\theta}S(n)$ set by:
modulating the data in units of every $\log_2 N$ binary bit data in a manner where the S(n) set and the $1e^{j\theta}S(n)$ set are alternately used.

20. The device of claim 18, wherein the program performs modulating the data by alternately using the S(n) set and the $e^{j\theta}S(n)$ set by:
modulating the data in units of every $\log_2 N$ binary bit data by using an $e^{j\theta k}S(n)$ set;
wherein k is a location number of a data symbol obtained after modulation, k is an integer between 0 and K−1, and K is a number of data symbols obtained after the modulation.

* * * * *